3,139,507
ELECTRIC ARC WELDING
Peter Kaesmacher, Stolberg, Germany, assignor to Gebr. Böhler & Co. Aktiengesellschaft, Vienna, Austria
No Drawing. Filed Mar. 26, 1962, Ser. No. 183,009
Claims priority, application Austria Mar. 31, 1961
5 Claims. (Cl. 219—74)

This invention relates to the use of an alloy steel as filler material for welding, which filler material results in a weld having a predominantly austenitic structure, which comprises about 19% Cr, 9% Ni and 3.5% Mo.

Such filler materials may be used for welding plain carbon steels, which may be in rimming, semi-killed or killed condition, and for welding low-alloy steels, and particularly for making welded joints between non-austenitic and austenitic steels.

The welding of alloy steels having the indicated chromium, nickel and molybdenum values results in a weld which consists of an austenitic structure containing between 10 and 20% ferrite. Owing to this structure, the weld has a coefficient of thermal expansion lying between those of austenitic steels and those of plain carbon steels and low-alloy steels.

A weld having such a coefficient of thermal expansion would be desirable both for making welded joints between non-austenitic steels as well as for making joints between austenitic and non-austenitic steels, in order to avoid stress cracks. Owing to the occurrence of embrittlement in the ferrite portion of the weld at temperatures above about 530° C., however, the filler material to be used according to the invention may be used only for such welded joints which are not subjected to operating temperatures exceeding 530° C.

In the making of welded joints with filler materials containing about 19% Cr, 9% Ni and 3.5% Mo, however, by usual manual welding, it is difficult to avoid pores and possible heat cracks in the weld even when working with the utmost care.

According to the invention, this difficulty may be avoided by the application of electric arc welding under a protective gas if the filler material consists of 0.05–0.15% C, 0.6–1.4% Si, 0.5–2.0% Mn, 18.5–19.5% Cr, 8.5–9.5% Ni, 3–4% Mo, balance iron and inevitable impurities Compared to manual welding with similar electrodes having coatings, the use of protective gas welding with filler materials according to the invention enables a much higher welding speed and the avoidance of undesired pores in the weld. Besides, the welding under constrained conditions can be performed more easily and without faults when a protective gas and thin wires are used. In this case too, a higher welding output can be achieved than with manual welding.

Inert gases, such as argon or helium, with oxygen additions, if desired, as well as dry carbon dioxide, and mixtures of these gases may be used as protective gas.

An example of a composition which may be used according to the invention contains 0.075% C, 0.92% Si, 0.93% Mn, 18.50% Cr, 9.10% Ni, 3.45% Mo, balance iron and inevitable impurities.

What is claimed is:

1. A process for joining two parts of steel selected from the group consisting of plain carbon steels and low alloy steels which comprises: positioning said two parts of steel in proximity with one another, and joining said two parts by gas-shielded electric arc welding using as a filler material, an alloy steel consisting of 0.05–0.15% C, 0.6–1.2% Si, 0.5–2.0% Mn, 18.5–19.5% Cr, 8.5–9.5% Ni, 3–4% Mo, balance iron and inevitable impurities, to form a joint which will resist temperatures up to 530° C. and which consists of an austenitic structure containing between 10% and 20% ferrite.

2. The process of claim 1 wherein both parts to be joined are plain carbon steel.

3. The process of claim 1 wherein both parts to be joined are low-alloy steel.

4. The process of claim 1 wherein of the two parts to be joined one part is plain carbon steel and the other part is low-alloy steel.

5. The process of claim 1 wherein of the two parts to be joined one part is an austenitic steel and the other part is a non-austenitic steel.

References Cited in the file of this patent

FOREIGN PATENTS 821,603   France _____ Aug. 30, 1937